(12) United States Patent
Falk

(10) Patent No.: US 11,432,156 B2
(45) Date of Patent: Aug. 30, 2022

(54) SECURITY UNIT FOR AN IOT DEVICE AND METHOD FOR RUNNING ONE OR MORE APPLICATIONS FOR THE SECURED EXCHANGE OF DATA WITH ONE OR MORE SERVERS WHICH PROVIDE WEB SERVICES

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 241 days.

(21) Appl. No.: 16/490,974

(22) PCT Filed: Dec. 19, 2017

(86) PCT No.: PCT/EP2017/083453
§ 371 (c)(1),
(2) Date: Sep. 4, 2019

(87) PCT Pub. No.: WO2018/162109
PCT Pub. Date: Sep. 13, 2018

(65) Prior Publication Data
US 2020/0028829 A1    Jan. 23, 2020

(30) Foreign Application Priority Data

Mar. 7, 2017 (EP) .................................. 17159631

(51) Int. Cl.
*H04L 12/40* (2006.01)
*H04W 12/40* (2021.01)
(Continued)

(52) U.S. Cl.
CPC .......... *H04W 12/40* (2021.01); *H04L 9/0891* (2013.01); *H04L 63/0428* (2013.01);
(Continued)

(58) Field of Classification Search
CPC .................... H04W 12/0433; H04L 9/0891
See application file for complete search history.

(56) References Cited

U.S. PATENT DOCUMENTS 6,735,627 B2    5/2004  Urien
2009/0031131 A1  1/2009  Pasion et al.
(Continued)

FOREIGN PATENT DOCUMENTS

CN    101816140 A    8/2010
CN    102823191 A    12/2012
(Continued)

OTHER PUBLICATIONS

Leinonen Aki-Petteri et al: "Implementing Open Authentication for Web Services with a Secure Memory Card", Near Field Communication (NFC), 2012 4th International Workshop on, IEEE, pp. 31-35, XP032155322, DOI: 10.1109/NFC.2012.15; ISBN: 978-1-4673-1209-7; Chapter IV and VI;; 2012.
(Continued)

*Primary Examiner* — Esther B. Henderson
(74) *Attorney, Agent, or Firm* — Schmeiser, Olsen & Watts LLP

(57) ABSTRACT

A security unit which is suitable for a device, in particular an IOT device, for running one or more applications for a secure data exchange with one or more servers which provide web services is provided. The security unit is designed with the following:—means for imaging original data onto corresponding replacement data and/or vice versa, wherein the original and/or replacement data forms a respective original and/or replacement key and/or can be used to
(Continued)

form same—means for detecting a replacement key which is supplied by an application being ran and which corresponds to an original key, and—means for providing a required original key which corresponds to the replacement key using the imaging means in order to allow the original key to be used for the secure data exchange with the server.

18 Claims, 2 Drawing Sheets

(51) Int. Cl.
    *H04L 9/08*     (2006.01)
    *H04L 9/40*     (2022.01)
    *H04L 67/02*     (2022.01)
    *H04W 12/041*     (2021.01)
    *H04W 12/0433*     (2021.01)
    *H04W 12/03*     (2021.01)
    *H04W 12/084*     (2021.01)

(52) U.S. Cl.
    CPC ............ *H04L 63/166* (2013.01); *H04L 67/02* (2013.01); *H04W 12/041* (2021.01); *H04W 12/0433* (2021.01); *H04W 12/03* (2021.01); *H04W 12/084* (2021.01)

(56) References Cited

U.S. PATENT DOCUMENTS

| | | | | |
|---|---|---|---|---|
| 2011/0271110 A1* | 11/2011 | Ohba | ................ | H04W 12/0433 713/168 |
| 2013/0031357 A1 | 1/2013 | Gawlas et al. | | |
| 2014/0068706 A1 | 3/2014 | Aissi | | |
| 2014/0161260 A1* | 6/2014 | Wu | ...................... | H04L 9/0822 380/278 |
| 2016/0330182 A1* | 11/2016 | Jeon | ..................... | A43B 3/0005 |
| 2017/0244687 A1* | 8/2017 | Moulds | ..................... | G06F 7/00 |
| 2017/0272945 A1* | 9/2017 | Link, II | ................ | H04L 9/3242 |

FOREIGN PATENT DOCUMENTS

| | | |
|---|---|---|
| CN | 104704505 A | 6/2015 |
| CN | 106330971 A | 1/2017 |
| GB | 2525426 A | 10/2015 |

OTHER PUBLICATIONS

Internet: https://tools.ietf.org/html/rfc7519 May 2015; M. Jones; Internet Engineering Task Force.
Internet: http://blog.keycloak.org/2015/10/authentication-of-clients-with-signed.html Jan. 2017.
Internet: https://tools.ietf.org/html/rfc6749 Oct. 2012; D. Hardt, Ed. Microsoft 2012; Internet Engineering Task Force.
"Information Supplement: PCI DSS, Tokenization Guidelines Standard: PCI Data Security Standard (PCI DSS)", XP055219868, Gefunden im Internet: URL:https://www.pcisecuritystandards.org/documents/Tokenization_Guidelines_Info_Supplement.pdf; [gefunden am Oct. 9, 2015] Chapter 3 and 5 URL:https://www.pcisecuritystandards.org/documents/Tokenization Guidelines Info Supplement.pdf, [gefunden am Oct. 9, 2015] in der Anmeldung erwähnt catture 1, 3 and 5; 2011.
Anonymous: "Tokenization (data security)—Wikipedia", XP055369766, Gefunden im Internet: URL:https://en.wikipedia.org/w/index.php?title=Tokenization (data security)&oldid=767180347 ; [gefunden am May 5, 2017] in der Anmeldung erwähnt p. 1-p. 1; 2017.
Internet: https://en.wikipedia.org/wiki/OAuth Feb. 2017.
Anonymous: "JSON Web Token—Wikipedia", XP055369783, Gefunden im Internet: URL:https://en.wikipedia.org/w/index.php?title=JSON_Web_Token&oldid=764241972, [gefunden-am May 5, 2017]; the whole document; 2017.
PCT International Search Report daated Apr. 5, 2018 corresponding to PCT International Application No. PCT/EP2017/083453 filed (Dec. 19, 2017).

\* cited by examiner

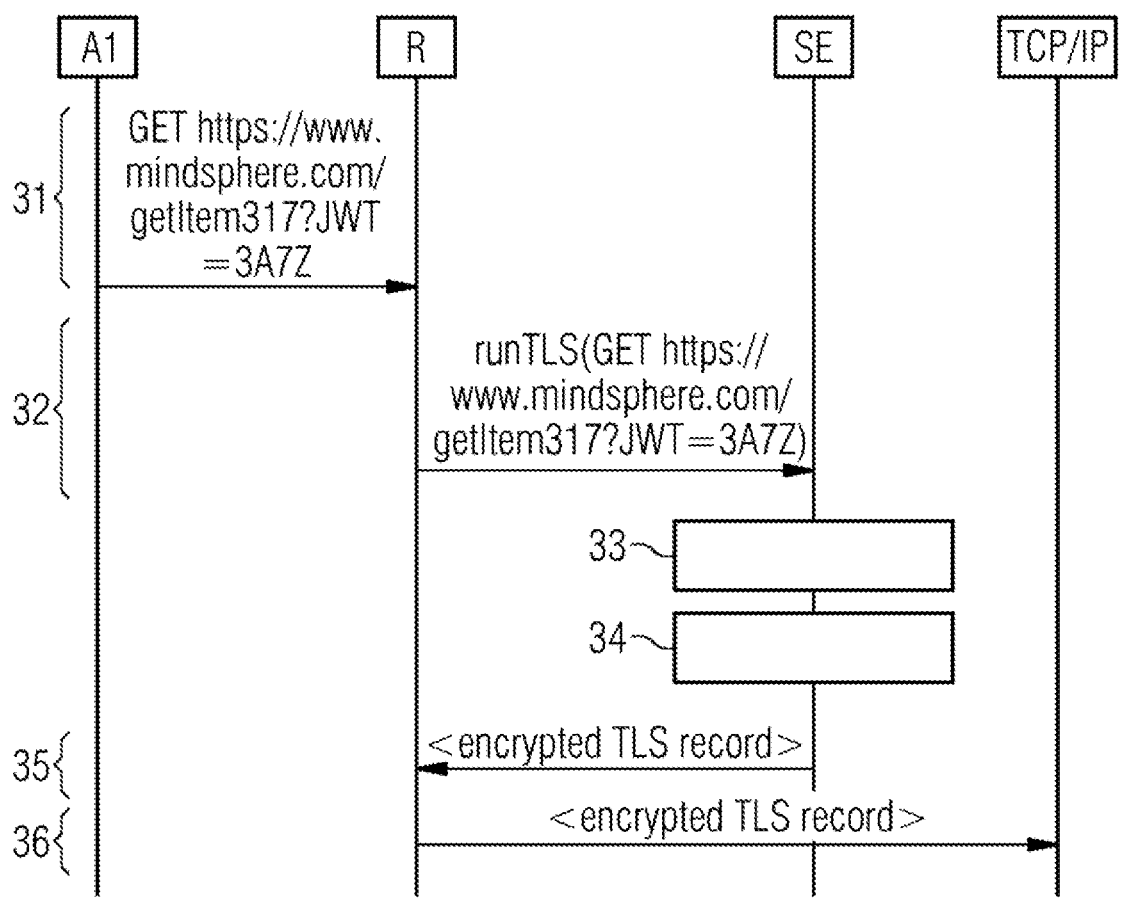

SECURITY UNIT FOR AN IOT DEVICE AND METHOD FOR RUNNING ONE OR MORE APPLICATIONS FOR THE SECURED EXCHANGE OF DATA WITH ONE OR MORE SERVERS WHICH PROVIDE WEB SERVICES

CROSS-REFERENCE TO RELATED APPLICATIONS

This application claims priority to PCT Application No. PCT/EP2017/083453, having a filing date of Dec. 19, 2017, which is based on European Application No. 17159631.5, having a filing date of Mar. 7, 2017, the entire contents both of which are hereby incorporated by reference.

FIELD OF TECHNOLOGY

The following relates to a security unit, in particular for an IoT device and to a method for running one or more applications for the secured exchange of data with one or more servers which provide web services, and to an associated computer program (product).

BACKGROUND

A trust anchor is used for computer systems, inter alia, also for embedded systems and IoT devices in order to implement security functions in a trustworthy and attack-resistant fashion. A conventional trust anchor (e.g. crypto controller, secure element) serves essentially only to store cryptographic keys and to execute elementary cryptographic operations (e.g. encryption, decryption using the locally stored key). The trust anchor is addressed by an application processor which runs software or an application. The application processor can, however, also run manipulated software (e.g. if weak points are utilized by an attacker) and therefore then use the cryptographic services provided by a trust anchor. Therefore, there is a need to protect sensitive application logic for the use of cryptographic basic operations. There is also a need for better protection of the handling of JSON Web Tokens (JWT) which are used intensively for internet-based web services and IoT services.

The term embedded system denotes an electronic computer or else computer which is integrated (embedded) in a technical context. In this context, the computer generally performs monitoring or open-loop or closed-loop control functions or is responsible for a form of data processing or signal processing, for example during encryption or decryption, coding or decoding or filtering. The category "embedded system" can also include a field device, referred to for short as FD.

The term internet of things (IoT) describes that the digital world is increasingly extending beyond the (personal) computer into "intelligent objects", extending as far as "AI", artificial intelligence. The "internet of things", which is often being implemented with ever smaller embedded systems, is intended to assist the user in his activities in an imperceptible fashion, without distracting him or even being at all noticeable.

The use of crypto-controllers or hardware secure elements (chip card processor, trusted platform modules, security modules) is possible. These are specially protected microprocessors. There are also generally microcontrollers/application processors with integrated key memories (fuses) and hardware crypto-engines (performance, current consumption).

U.S. Pat. No. 6,735,627 discloses a system and a method for so-called smart cards which permit multimedia data to be transmitted via an IP-based network. In this context, the TLS communication protocol is implemented on a secure element (smart card chip). In the case of credit cards, specific services or applications for replacing the credit card number by a pseudonym are known, so that the actual credit card numbers are not present in the commercial billing system. This is referred to as tokenization, see e.g.:

https://en.wikipedia.org/wiki/Tokenization (data security) and https://www.pcisecuritystandards.org/documents/Tokenization Guidelines Info Supplement.pdf.

Many web services are protected on the basis of OAUTH (authentication protocol, see https://en.wikipedia.org/wiki/OAuth, https://tools.ietf org/html/rfc6749), (by using JSON Web Tokens). The tokens are stored nowadays on the client platform by the application.

Overview of JSON Web Tokens (JWT) given by e.g. https://en.wikipedia.org/wiki/JSON Web Token.

JWT are standardized in the Internet Standard RFC 7519 (https://tools.ietforg/html/rfc7519).

It is known that a client generates its JWT itself, see e.g.: http://blog.keycloak.org/2015/10/authentication-of-clients-with-signed.html.

The security within such infrastructure and the prevention of intentional attacks are playing an increasingly important role. Successful manipulation can result in a malfunction in control functions of the abovementioned devices.

Cryptographic protection functions can achieve objectives such as integrity, confidentiality or authenticity of the objects. This makes it possible to defend against intentional targeted attacks.

The term "security" refers essentially to the security, confidentiality and/or integrity of data as well as their transmission and also security, confidentiality and/or integrity when corresponding data are being accessed. The authentication when transmitting data or when accessing data also includes, inter alia, the term "security". A cryptographic functionality is generally understood to mean, for example, a function for performing encryption, for protecting confidentiality, for protecting integrity and/or for authenticating data (e.g. user data, control data, configuration data or administrative data). The cryptographic protective functionality can comprise here, for example, one or more of the functionalities specified below:
  storage of keys
  system and/or user authentication
  attestation
  encryption
  decryption
    calculation of a cryptographic checksum (e.g. signature)
    checking a cryptographic checksum (e.g. signature)
    processing a key
    generating a key
    generating random numbers (e.g. seed generation)
    licensing
    supporting systematic monitoring functions (e.g. tamper protection, system integrity, security incident and event management (SIEM)
    monitoring data
    validating data
    filtering data The enumerated cryptographic functionalities can each be implemented here again with other/further methods or combinations of these methods.

Furthermore, it is possible for a user to transmit, as part of an HTTP enquiry, an authorization token as a data structure (see JWT, JSON Web Token above) from the user (web browser) to the web server. The JWT authorization token is normally issued by a "single sign on" service. Furthermore, it is possible that the HTTP protocol (HTTP, CoAP) is transmitted over a cryptographically protected communication link (TLS, DTLS). In this context, usually only the server is authenticated by means of a digital certificate. However, it is also possible for the client also to obtain an authorization with its client certificate.

SUMMARY

An aspect relates to improving the security measures or protection measures for devices which are designed to carry out one or more applications for exchanging data with one or more servers which provide web services.

The embodiments of the invention claim a security unit (SE) which is suitable for a device, in particular an IoT device, for running one or more applications for the secured exchange of data with one or more servers which provide web services, wherein the security unit is designed with:
  means for mapping original data onto corresponding replacement data and/or vice versa, wherein the original data and/or replacement data each form an original key and/or replacement key and/or can be used to form them,
  means for detecting a replacement key which is supplied by an application which is run, and which corresponds to an original key, and
  means for providing a requested original key, corresponding to the replacement key, using the specified means for mapping, in order to be able to use the original key for the secured exchange of data with the server.

The mapping of original data onto replacement data or of replacement data onto original data (demapping) can be implemented or carried out by means of an assignment table.

In order to make the exchange of data possible, the original key can be used not only in the case of a link setup, but can possibly also generally be used when an enquiry message is transmitted to a server. The enquiry message can be e.g. a link setup enquiry message, an enquiry message for the exchange of data (e.g. MQTT, XMPP) or a web service enquiry message (HTTP, CoAP).

One development of embodiments of the invention provides for the transparent passing on of the original key on the communication protocol level which can be used for the secured exchange of data.

One development of embodiments of the invention provides that the transport layer security encryption, abbreviated to TLS or DTLS, is used in the communication protocol level.

One development of embodiments of the invention provides that a place holder which is set as a replacement key in the communication protocol for the secured exchange of data can be replaced by the original key which is provided.

One use of a trust anchor/secure element or of the security unit is simplified by application programmers by employing technologies which are customary on the Internet (JSON Web Token). Direct use of cryptographic operations which are susceptible to errors and under certain circumstances can be manipulated is not necessary. JSON web tokens as security-critical data do not have to be used in the normal application code here. This makes it more difficult to exploit weak points in the application code.

A further aspect of embodiments of the invention is an IoT device comprising a security unit of the type mentioned above, wherein the IoT device has
  one or more applications designed to exchange data with one or more servers which provide web services, and
  at least one implementation unit which is designed to run the one or more applications.

One development of the device provides that the one or more applications can use such a replacement key to run.

One development of the device provides that the replacement key is replaced by the requested original key, provided by the security unit, by means of the implementation unit.

One development of the device provides that the replacement key is replaced by the requested original key, provided by the security unit, by means of the security unit.

A further aspect of embodiments of the invention is a method for running one or more applications for the secured exchange of data between a device, in particular an IoT device and one or more servers which provide web services, wherein the following steps are executed:
  transmitting a message for the exchange of data by an application which is being run, wherein the message is modified by mapping original data onto corresponding replacement data which each form an original key and/or replacement key and/or are used to form them,
  detecting the replacement key which is supplied by the application which is being run and which corresponds to the original key, and
  providing a requested original key, corresponding to the replacement key, using demapping of the specified mapping in order to use the original key for secured exchange of data, initiated by means of the specified message, with the server.

An authentication code and/or an authentication checksum can be inserted into the above-mentioned message.

The abovementioned functions/steps can be implemented using software, firmware and/or hardware. They can be understood to be types of functional units which, in terms of their function, can also be integrated in any desired combination into a single unit (component or server or device).

A further aspect of embodiments of the invention can be a computer program or a computer program product (non-transitory computer readable storage medium having instructions, which when executed by a processor, perform actions) having at least one computer program with means for carrying out the method and the abovementioned refinements thereof when the computer program (product) and/or the at least one computer program are/is run in the IoT device of the type described above.

The above devices and methods and, if appropriate, the computer program (product) can be correspondingly embodied and/or developed essentially in an analogous fashion to the security unit and the refinements or developments thereof.

BRIEF DESCRIPTION

Some of the embodiments will be described in detail, with references to the following Figures, wherein like designations denote like members, wherein:

FIG. 3 shows a flow diagram in which the demapping of the replacement key onto the original key is carried out by the security unit.

DETAILED DESCRIPTION

Figure 1:
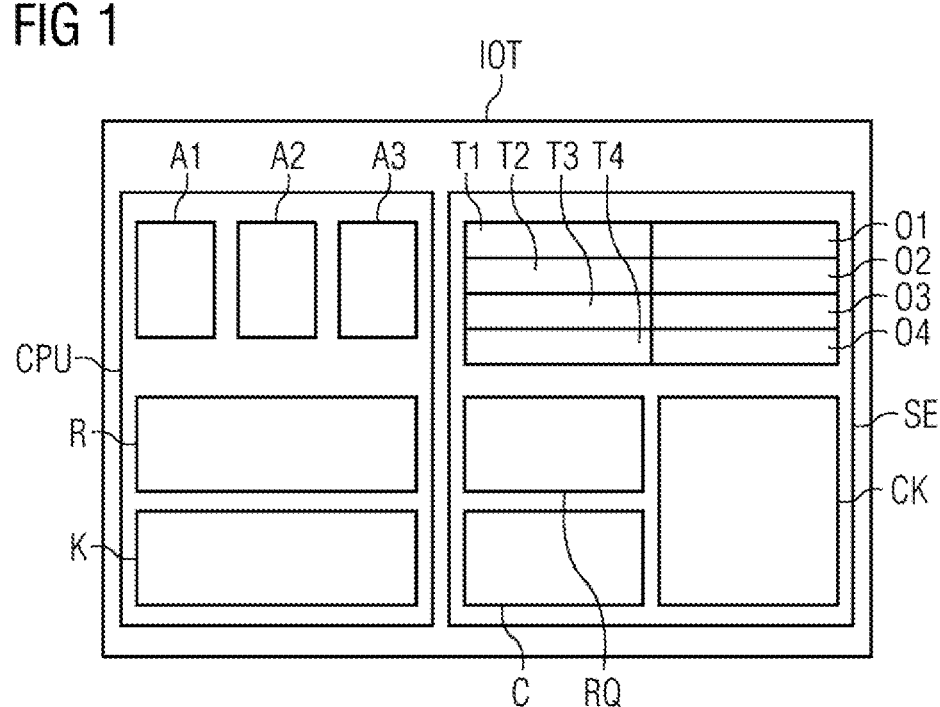
FIG. 1 shows an embodiment of the embedded system.

FIG. 1 shows an example of an embedded system in the form of an IoT device having a computing unit CPU (application processor) having a Linux-based operating system, an implementation unit in the form of an application or app running time environment R and a plurality of apps A1, A2, A3 (applications). The computing unit CPU implements the apps A1, A2, A3 successively or in parallel by means of the Linux kernel K using the implementation unit R. The apps communicate (not illustrated) via a protocol, in particular HTTP, CoAP, REST, MQTT, XMPP, with a server which makes available web services.

The IoT device IOT has a security unit SE for JSON web tokens or other keys which can be derived from corresponding data. The security unit SE comprises here a mapping table or assignment table between what are referred to as tokenized JWT T1, T2, T3, T4 (replacement JWTs or keys which are used by the apps within the IoT device) and the original JWTs O1, O2, O3, O4 (original keys) which are used for the external web services. The app running time environment replaces here e.g. an HTTP/REST request message which is transmitted by an app to the app runtime, the "tokenized JWT" contained therein with the real JWT. In one embodiment, the HTTP/REST request message RQ is transmitted for this purpose to the security unit SE and protected (encrypted) there by means of a TLS protocol after the replacement of the JWT, and the encrypted message is transmitted back to the implementation unit R, in order then to transmit the message to a server (not illustrated) e.g. via a TCP link or as a UDP packet via a network interface. Furthermore, the security unit SE has here a JWT client key CK. The security unit SE can therefore generate, by means of a generation unit C, for example a client-signed JWT token, in a protected implementation unit or app running time environment. Furthermore, the security unit can generate a protected JWT request message RQ with which a session JWT token (access token) can be requested in a protected fashion from a web service, made available by the server, in particular from what is referred to as an IAM web service using a refresh JWT token.

The security unit can be implemented using hardware, as firmware or as a software process which is separated by means of a hypervisor. The security unit can be implemented on a client system, in particular, on an IoT device or on some other embedded device or mobile device. However, it can basically also be implemented on a server, in particular a cloud-based web service system.

The security unit can have or provide completely or partially the following (partial) functionalities and/or means:

local issuing of a client JWT (client-signed JWT using a locally stored cryptographic key)

issuing a protected request message for requesting a new access token by means of a refresh token stored on the security unit SE providing a replacement JWT (tokenization of the JSON web token mentioned at the beginning). In one application, the replacement JWT can be used instead of the original (actual) JWT token. In other words, there is a bijective mapping or assignment table of original data onto corresponding replacement data which each form an original JWT (O1, O2, O3, O4) and/or replacement JWT (T1, T2, T3, T4) and/or are used to form them.

As a result, manipulated application software, e.g. a web service client, cannot pass on the original JWT directly, for example. The replacement JWT which is used by the application is replaced transparently by the security unit (e.g. the application transmits an HTTP/REST message to the security unit SE which replaces the replacement JWT with the assigned actual JWT token (demapping) and transmits it via a TLS-protected communication link;

inserting a JWT into a TLS/DTLS datastream (modification of the clear text in the encryption path in order to expand the JWT; the application, e.g. A1, sets an identifier or place holder here which is replaced with the genuine token). There is therefore no genuine tokenization but instead the JWT is entered into a format field (e.g.: "##JSONWEBTOKEN ##").

issuing an owner checksum for the use of a JWT with specific user data (e.g. message authentication code)

Figure 2:
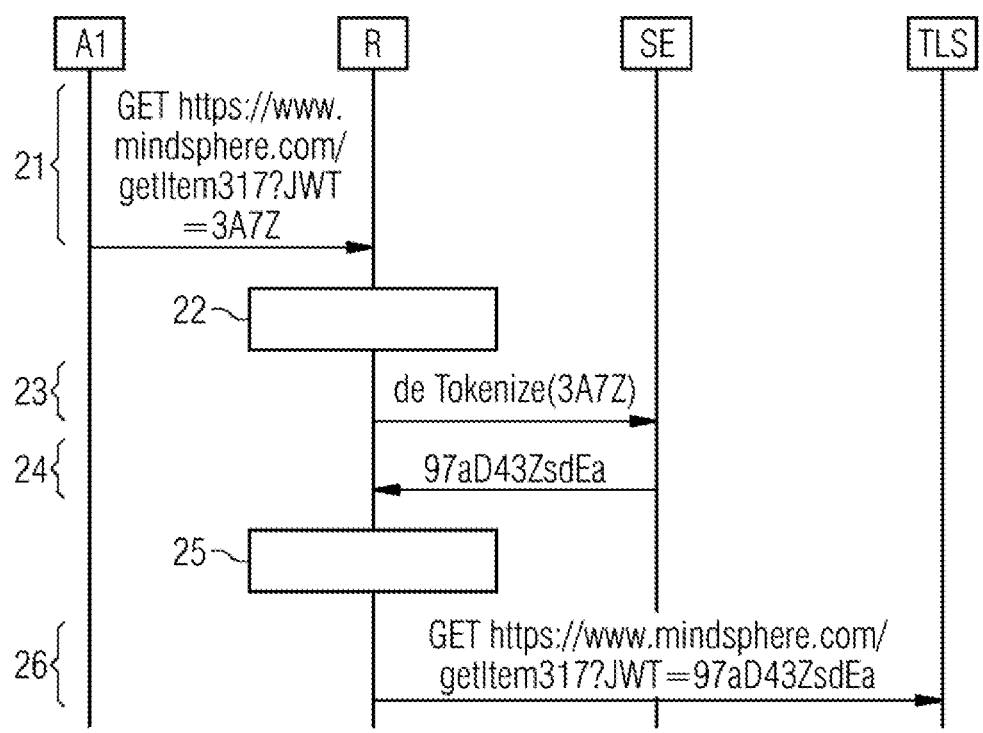
FIG. 2 shows a flow diagram in which the demapping of the replacement key onto the original key is carried out by the implementation unit.

FIG. 2 shows a possible sequence which is characterized by individual steps 21 to 26, on the IoT device in which an application (app), e.g. here A1, would like to send a request message. To do this, in step 21 the application A1 transmits the message to an application program interface (not illustrated), abbreviated to API, of the implementation unit R. The message contains a replacement key in the form of a tokenized JWT. On the basis of the message, an enquiry is made to the security unit SE in order to replace the tokenized JWT with the original or real externally valid JWT. The implementation unit R checks in step 22 whether a tokenized replacement JWT is present and forms, in steps 23 and 24, 25 (demapping), a modified enquiry message which contains the original JWT instead of the tokenized replacement JWT. The latter is transferred in step 26 to a TLS communication stack (stack) TLS in order to transmit it to the specified server.

This has the advantage that the application (app), here e.g. A1, does not know the actual JWT which is externally valid. Therefore, even a manipulated application cannot disclose the JWT.

FIG. 3 shows an embodiment of a sequence which is characterized by individual steps 31 to 36 in which the handling of the JWT tokens takes place and the TLS protocol is implemented on the security unit. TLS is a transport layer security encryption which is abbreviated to TLS for underlying TCP-based transmission or to DTLS for an underlying UDP-based transmission.

In this context, step 31 runs like step 21. In step 32, the abovementioned message is passed through to the security unit in a transparent fashion (=tunneled passing on or in a way which cannot be seen from the outside), wherein for this purpose the implementation unit R requests the security unit SE, for example with the instruction "runTLS", to use the TLS protocol to transmit the message. In step 33, the tokenized replacement JWT is then replaced with the original JWT and incorporated into the TLS protocol (step 34) and transferred to the implementation unit (step 35). In step 36 it is then transferred to a TCP/IP communication stack (stack) TCP/IP in order to transmit it to the specified server.

It is possible that in the above embodiments a place holder in the communication protocol (HTTP, CoAP, MQTT, TLS, TCP/IP) is occupied by the replacement key.

An authentication code and/or an authentication checksum can be inserted into the abovementioned message.

Although embodiments of the invention have been illustrated and described in detail by means of the preferred exemplary embodiments, the following is not limited to the disclosed examples and other variations can be derived therefrom by a person skilled in the art without departing from the scope of protection of embodiments of the invention.

The implementation of the processes or method sequences described above can be carried out on the basis of instructions which are present on the computer-readable storage media or in volatile computer memories (referred to below in summarized form as computer-readable memories). Computer-readable memories are, for example, volatile memories such as caches, buffers or RAMs as well as non-volatile memories such as removable media, hard disks, etc.

The functions or steps described above can be present here in the form of at least one instruction set in or on a computer-readable memory. The functions or steps are not tied here to a specific instruction set or to a specific form of instruction sets or to a specific storage medium or to a specific processor or to specific implementation schemes and can be implemented by means of software, firmware, microcode, hardware, processors, integrated circuits etc., alone or in any desired combination. In this context, a wide variety of processing strategies can be used, for example serial processing by means of a single processor or multi-processing or multitasking or parallel processing etc.

The instructions can be stored in local memories, but it is also possible to store the instructions on a remote system and to access them via a network.

The terms "processor", "central signal processing", "control unit" or "data evaluation means" as used here comprise processing means in the widest sense, that is to say for example servers, universal processors, graphics processors, digital signal processors, application-specific integrated circuits (ASICs), programmable logic circuits such as FPGAs, discrete analog or digital circuits and any desired combinations thereof, including all other processing means which are known to a person skilled in the art or will be developed in future. Processors can be comprised here of one or more devices or apparatuses or units. If a processor comprises a plurality of devices, these devices can be designed or configured for parallel or sequential processing or implementation of instructions.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A security unit which is suitable for an IoT device, for running one or more applications for a secured exchange of data with one or more servers which provide web services, with the security unit comprising a computing unit with one or more processors, the security unit configured to perform a method comprising:
   mapping original data onto corresponding replacement data, wherein the original data form an original key or can be used to form the original key, and the replacement data form a replacement key or can be used to form the replacement key,
   detecting the replacement key which is supplied by an application which is run, and which corresponds to the original key;
   providing a requested original key, corresponding to the replacement key, in order to be able to use the original key for the secured exchange of data with the one or more servers; and
   transmitting, by the application, a message for the exchange of data to an application program interface of an implementation unit, wherein the message is modified by the mapping, and wherein the replacement key is in the form of a tokenized JSON web token.

2. The security unit as claimed in claim 1, the method further comprising transparent passing on of the original key on the communication protocol level which can be used for the secured exchange of data.

3. The security unit as claimed in claim 1, wherein the transport layer security encryption (TLS or DTLS), is used in the communication protocol level.

4. The security unit as claimed in claim 1, wherein a place holder which is set as a replacement key in the communication protocol for the secured exchange of data can be replaced by the original key which is provided.

5. The security unit as claimed in claim 1, further comprising the IoT device, wherein the IoT device comprises:
   one or more applications designed to exchange data with one or more servers which provide web services, and
   at least one implementation unit which is designed to run the one or more applications.

6. The IoT device as claimed in claim 5, wherein the one or more applications can use such a replacement key to run.

7. The IoT device as claimed in claim 1, wherein the replacement key is replaced by the requested original key, provided by the security unit, by means of the implementation unit.

8. The IoT device as claimed in claim 1, wherein the replacement key is replaced by the requested original key, provided by the security unit, by means of the security unit.

9. A method for running one or more applications for a secured exchange of data between an IoT device and one or more servers which provide web services, the method comprising:
   transmitting, by an application of a computing unit, a message for the exchange of data by an application which is being run, wherein the message is modified by mapping original data onto corresponding replacement data which each form an original key and replacement key and are used to form the original key and the replacement key;
   detecting, by the processor of the computing unit, the replacement key which is supplied by the application which is being run and which corresponds to the original key;
   providing, by the processor of the computing unit, a requested original key, corresponding to the replacement key, using demapping of the mapped original data in order to use the original key for secured exchange of data, initiated by message, with the server; and
   transmitting, by the application, a message for the exchange of data to an application program interface of an implementation unit, wherein the message is modified by the mapping, and wherein the replacement key is in the form of a tokenized JSON web token.

10. The method as claimed in claim 9, wherein the transport layer security encryption (TLS or DTLS), is used in the communication protocol level.

11. The method as claimed in claim 9, wherein a place holder which is set as a replacement key in the communication protocol for the secured exchange of data is replaced by the original key which is provided.

12. The method as claimed in claim 9, wherein an authentication code and/or an authentication checksum are/is inserted into the message.

13. A computer program product, comprising a computer readable hardware storage device having computer readable program code stored therein, said program code executable by a processor of a computer system to implement a method when the computer program product is run in the IoT device, the method comprising:
- transmitting, by an application of a computing unit, a message for the exchange of data by an application which is being run, wherein the message is modified by mapping original data onto corresponding replacement data which each form an original key and replacement key and are used to form the original key and the replacement key;
- detecting, by the processor of the computing unit, the replacement key which is supplied by the application which is being run and which corresponds to the original key;
- providing, by the processor of the computing unit, a requested original key, corresponding to the replacement key, using demapping of the mapped original data in order to use the original key for secured exchange of data, initiated by message, with the server; and
- transmitting, by the application, a message for the exchange of data to an application program interface of an implementation unit, wherein the message is modified by the mapping, and wherein the replacement key is in the form of a tokenized JSON web token.

14. The security unit as claimed in claim 1, the method further comprising:
- on the basis of the message, enquiring to a security unit in order to replace the tokenized JSON web token with the original key, wherein the original key is in the form of a JSON web token that is externally valid.

15. The security unit as claimed in claim 14, the method further comprising:
- checking whether the tokenized JSON web token of the replacement key is present, by the implementation unit.

16. The security unit as claimed in claim 15, the method further comprising:
- forming, by the implementation unit, a modified enquiry message that contains the original message in the form of the JSON web token instead of the tokenized JSON web token of the replacement key.

17. The security unit as claimed in claim 16, the method further comprising:
- transferring the original message in the form of the JSON web token to the one or more servers, such that the application does not know the original message in the form of the JSON web token that is externally valid.

18. The security unit as claimed in claim 17, wherein manipulation of the application cannot disclose the original message in the form of the JSON web token that is externally valid.

\* \* \* \* \*